United States Patent
Walker et al.

(10) Patent No.: US 6,945,243 B1
(45) Date of Patent: Sep. 20, 2005

(54) DUTCH OVEN STAND

(76) Inventors: Michael Eric Walker, 18754 Parthenia St. #6, Northridge, CA (US) 91324; Jonathan B. Orlick, 11443 Awenits Ct., Chatsworth, CA (US) 91311; Roy Thomas Powell, Jr., 20338 Lassen St., Chatsworth, CA (US) 91311

( * ) Notice: Subject to any disclaimer, the term of this patent is extended or adjusted under 35 U.S.C. 154(b) by 0 days.

(21) Appl. No.: 10/765,408

(22) Filed: Jan. 27, 2004

(51) Int. Cl.⁷ .............................................. F24B 1/08
(52) U.S. Cl. ................................................ 126/9 R
(58) Field of Search ............................ 126/9 R, 25 R, 126/25 A, 41 R, 304 R, 304 A, 305, 41 B, 126/254 A, 25, 25 AA; 33/354, 391

(56) References Cited

U.S. PATENT DOCUMENTS

| | | | |
|---|---|---|---|
| 955,140 A | 4/1910 | Cronk | |
| 1,284,299 A | * 11/1918 | Freeon | .................... 126/25 R |
| 1,924,824 A | * 8/1933 | Yeager | ....................... 126/306 |
| 2,020,503 A | * 11/1935 | Hanson et al. | ........... 248/188.5 |
| 2,859,080 A | 11/1958 | Botnick | |
| 3,286,705 A | 11/1966 | Bedol | |
| 3,791,368 A | 2/1974 | Hunt | |
| 3,880,139 A | * 4/1975 | Young | ........................ 126/9 R |
| 4,539,901 A | * 9/1985 | Chen | ............................. 99/393 |
| 4,755,364 A | 7/1988 | La Chapelle et al. | |
| 4,903,683 A | 2/1990 | Larsen et al. | |
| 5,179,932 A | 1/1993 | DeCarlo | |
| 5,241,948 A | * 9/1993 | Thibodeau | ................ 126/25 R |
| 5,458,054 A | * 10/1995 | Yu | ............................... 99/446 |
| 5,947,105 A | * 9/1999 | Scott et al. | .................. 126/9 R |
| 5,979,431 A | 11/1999 | Hamilton et al. | |
| 6,182,650 B1 | 2/2001 | Tuttle | |
| 6,314,955 B1 | 11/2001 | Boetcker | |
| 2002/0020405 A1 | * 2/2002 | Coleman et al. | .......... 126/41 R |

FOREIGN PATENT DOCUMENTS

JP 7-42474 * 2/1995 ........... E21B 47/02

* cited by examiner

Primary Examiner—Stephen Gravini
(74) Attorney, Agent, or Firm—Jonathan Orlick (57) ABSTRACT

A portable Dutch Oven stand comprising a low aspect ratio and few parts which are integrally pieced together into one transportable unit. In a preferred form the Dutch Oven Stand includes a tray for holding cooking fuel (typically charcoal briquettes) at a safe distance from the ground while also maintaining such fuel from falling onto the ground, and while also supporting at least one Dutch Oven during cooking. The Dutch Oven stand also comprises folding legs permanently attached to the tray, a leveling means forming a part of the tray to level the stand prior to cooking, and a rotatable platform assembly for rotating a Dutch Oven while on the stand without lifting the Dutch Oven from the stand.

4 Claims, 5 Drawing Sheets

DUTCH OVEN STAND

CROSS REFERENCE TO RELATED APPLICATIONS

Not Applicable

FEDERALLY SPONSORED RESEARCH

Not Applicable

SEQUENCE LISTING OF PROGRAM

Not Applicable

BACKGROUND OF THE INVENTION

1. Field of the Invention

The present invention relates generally to Dutch oven stands. The novel features of the invention while particularly applicable to the use of Dutch ovens, may also be extended to other similar cooking apparatus.

2. Description of Related Art

Dutch oven cooking has survived from the days of the open hearth, and is still flourishing. When Lewis and Clark made their pioneering trek to the Northwest in 1805, they listed the Dutch oven as one of their most valued pieces of equipment. Legend has it that the Dutch oven was actually invented in colonial times by Paul Revere.

The oven was then widely manufactured in the New England states, but after traders from Holland bought large numbers for barter with the Indians and frontier settlers, the name "Dutch Oven" stuck. After widespread use in the colonies, the Dutch Oven followed the pioneers west as an indispensable utensil in the chuck wagon and the miner's mule pack. Today, river runners, wilderness campers and even home cooks consider the Dutch Oven an essential item, to whom it is affectionately referred to as the "D.O."

The name Dutch oven has been applied to a variety of cooking pots, kettles, and ovens over the years. To this day the name "Dutch Oven" is applied to various cast pots or kettles. The most common application of the name is to a cast iron pot or kettle with a flat bottom having three legs which form a part of the flat bottom to hold the oven above the cooking fuel, which is typically coals, flat sides and a flat, flanged lid for also holding coals on top of the Dutch Oven. These ovens typically have a steel bail handle attached to "ears" on each side of the oven near the top for carrying. Other ovens may also be called a "Dutch Oven" such as cast aluminum Dutch ovens and cast iron pots or kettles with rounded lids, flat bottoms and no legs.

The Dutch Oven of today has evolved over the years as various manufacturers made refinements and improvements over previous version of cast metal pots. For example, the shape of the "ears" has evolved as has the length and thickness of the legs. The lid also has seen many changes ranging from rounded to flat and from no lip to various shapes of lips or flanges.

Lodge Manufacturing Company, located in South Pittsburg, Tenn., a manufacturer of Dutch Ovens, distinguishes the two types of ovens by calling the rounded top, flat bottom oven with no legs, a Dutch Oven. The oven with a flat lid with a lip around the edge and a flat bottom with three legs they call a "Camp Oven".

No matter what you call it or what shape it is cast to, a well-prepared meal from a Dutch Oven has a delicious flavor unmatched by most other cookware.

A concern of users of Dutch ovens is that they will inadvertently create an unwanted fire or worse yet a wildfire where thousands of acres of forest are put at risk along with life and property. The problem arises because most often the art of using a Dutch oven, has heretofore involved the use of an open fire and or the use of charcoals placed on the ground. Presence of wind, human interaction with the Dutch Oven and with the fuel further has exacerbated the likelihood of an unwanted fire.

An additional objective for the Dutch Oven gourmets is the fact that it has often been difficult, when cooking directly on charcoals to maintain a level cooking vessel (especially when baking cakes and other similar foods), or to easily rotate a heavy Dutch oven over the coals without lifting it and in the process thereby disturbing the contents of the oven and/or the coals themselves. For those Dutch Oven cooking connoisseurs a nice level cake is very desirable, and a level cake starts with a level Dutch Oven.

Another objective for Dutch Oven users, especially for back packers, river runners and the like is the need for a solution to the foregoing objectives which is truly portable, takes up minimal space, forms an integral one-piece device, where parts cannot be lost, and which is durable and sturdy.

Many cooking devices have been devised over the years addressing various problems such as portability, wind resistant burners, control of airflow to the fuel, folding leg arrangements, adjustable cooking racks, primarily in the context of barbequing and grilling but none are known to describe singly or in combination the invention claimed.

A major limitation of many barbequing and grilling devices is they are not truly portable in the sense a backpacker could use them and they are cumbersome to use and they are not contemplated for use especially in the context of Dutch Oven cooking. Note, that while other conventional devices may have a small volume, volume is not the only factor affecting portability. A low-volume stove, for example, may lack portability due to its shape and configuration, exterior protrusions, high aspect ratio and number of removable parts which may become lost during transport or use. Hence, an object of this invention is to provide a low profile stand for ease of use, transport and storage.

Previous devices are not known to provide the instant invention's specific combination of features of portability coupled with adequate stability for the Dutch Oven cooking while also addressing leveling of the Dutch Oven while also including the fire prevention aspects of the instant invention.

For example:

U.S. Pat. No. 955,140 to Cronk describes a camping apparatus where a cooking platform having common openings is suspended by a tripod over an enclosure formed by wall sections to contain fuel for cooking, where the ground itself forms the bottom of the enclosure.

U.S. Pat. No. 3,276,705 to Bedol describes a collapsible barbeque grille using a tripod support apparatus along with a continuous circular sheet metal fuel bowl, to hold the fuel.

U.S. Pat. No. 6,182,650B1 to Tuttle, describes an adjustable-height tripod stand which supports an easy-to-level tri-pod stand having a steel burner plate for a Dutch Oven pot. The device contemplates the use of three legs forming the tripod which intersect with each other and the use of saw teeth on the legs which intersect with the snap-in-place steel plate in order to level the plate. Alternatively, the Tuttle device discloses the use of the Dutch oven itself snapped into the teeth and is used directly over coals on the ground or grass. The arrangement of this device makes it inherently unstable and susceptible to being toppled over by the wind or inadvertently by the user. Further, once cooking begins, it becomes difficult, if not dangerous to re-adjust the level of the steel cooking plate or Dutch oven, if necessary.

U.S. Pat. No. 5,179,932 to DeCarlo discloses a collapsible picnic cook stove, intended for use with a disposable pan-shaped fuel-holding member for burning fuel. This device contemplates the use of such disposable fuel trays disposed beneath a cooking grill and held in place by support rings. In as much as the trays are disposable, this creates an additional burden for back packers as this requires additional supplies to be taken. Further, in as much as this collapsible picnic cook stove requires the use of multiple parts to be assembled, it increases the chance that the disposable tray might become separated from the support rings and other elements of the stove during transport.

U.S. Pat. No. 3,791,368 to Hunt discloses a multipurpose portable cooking assembly having in one configuration a charcoal boiler tray, which is supported by pivotal legs. This device is not truly portable in the form described by the instant invention and is not intended for use with ovens. The device disclosed by Hunt contains multiple parts forming its assembly which can become separated during use and transport of the multipurpose cooking assembly.

U.S. Pat. No. 2,859,080 to Botnick; describes a collapsible table having a rotating top. The tabletop of the Botnick device cannot be leveled on uneven terrain and the tabletop sits atop of rods, which are inherently unstable and subject it to being easily toppled over by the wind or by inadvertent colliding with the device by the user. Botnick does not describe a device for use in connection with cooking.

U.S. Patent to Hamilton et. al. describes a portable stove containing burners, wherein each burner is surrounded by a wind retardant bowl. The stove also includes shelves, which lock into place during use and storage along with legs which may be folded and secured to the stove during storage. Hamilton is not portable in the sense it can be placed into a hiker's backpack and it is comprised of multiple parts which can become separated from the stove while being transported.

U.S. Patent to Boetcker describes a three legged collapsible outdoor barbeque and cooking stove apparatus and method having multiple housing assemblies, which provide the user with the ability to control air flow to the fuel via the use of vent holes in connection with fire chamber assembly which includes a fire housing having a fuel pan and outer assembly including vent holes. Rotational interaction between the fire housing and the vent holes and fuel pan vent holes allow the user to effectively control the flow of air to the fuel. While Boetcker discloses its potential use of the device with a Dutch Oven, its design does not provide the stability, portability, leveling features, or the ability to easily rotate the Dutch oven while cooking of the instant invention.

U.S. Pat. No. 4,903,683 to Larsen et. al. discloses an apparatus and method for Dutch Oven cooking over charcoal, which incorporates the use of a propane burner to quickly pre-heat charcoal briquettes. This device contemplates the use of a bulky propane tank to quickly ignite coals in a bulky charcoal-containing hopper. While Larsen appears to have advantages directed to pre-heating charcoal fuel, it does not provide the stability, portability, leveling features, or the ability to easily rotate the Dutch oven while cooking of the instant invention.

From the foregoing, the need should be appreciated for an environmentally safe, simply constructed, sturdy, easy to use, small, integral assembly, reusable, inexpensive, portable cooking stand for Dutch Ovens. Further, the need should be recognized for a simple way to level the stand and for the need to rotate the Dutch Oven over the fuel without actually lifting the oven itself.

Accordingly, a fuller understanding of the invention may be obtained by referring to the SUMMARY OF THE INVENTION, and the DETAILED DESCRIPTION OF THE PREFERRED EMBODIMENT, in addition to the scope of the invention as defined by the claims taken in conjunction with the accompanying drawings.

SUMMARY OF THE INVENTION

This invention resides in certain novel features of construction, combination and arrangement of elements and portions as will hereinafter be described with specificity in the detailed description of certain embodiments, as particularly pointed out in the appended claims, and illustrated by the accompanying drawings.

For the purposes of summarizing the invention, the invention comprises a portable Dutch Oven stand, which is truly portable in the context of camping and backpacking, consisting of a low aspect ratio and few parts. In its preferred form the invention includes a "one-piece" easily transportable device, including a rectangular tray for holding the cooking fuel (typically charcoal briquettes), folding legs permanently attached to the rectangular tray, a leveling means forming part of the rectangular tray, and a rotatable platform means.

For example, in actual use a camper will take the Dutch Oven stand and extend its legs to a fully open position and then place the stand on its legs on the ground. The camper will visually adjust the placement of the stand to a level position by observing the position of the bearings that form a part of the leveling mechanism of the stand. Once properly positioned the camper places fuel into the rectangular tray and then places the Dutch Oven with its contents to be cooked onto the rotatable platform which forms a part of the rectangular tray. It is noted that other embodiments of the invention need not include the rotatable platform or the leveling mechanisms.

In some cases where there is a lot of cooking to be done, a user may wish to place several Dutch Ovens on top of each other, all of which are intended to be supported by the invention.

It is an object of this invention to provide a device and method for holding fuels used in cooking with a Dutch Oven in a safe proximity from the ground and surrounding environment, to reduce the chance of fire.

It is a feature of the invention to provide a device which holds the fuel and which shelters the fuel from the wind and from falling out to the ground.

It is an advantage of the invention to hold the fuel in a safe proximity from the ground while also keeping the fuel in proximity to the Dutch Oven itself for proper Dutch Oven cooking.

Another object of this invention is to provide a portable platform for use with Dutch Ovens that has adequate stability for use with Dutch Oven cooking.

An advantage of this invention is that it provides a low-profile "one-piece" stand for ease of use, transport and storage.

It is yet another object of this invention to provide a device and method for leveling a Dutch Oven when used for cooking.

A feature of the present invention to provide a rotatable platform which allows the Dutch Oven and its contents to be rotated over the fuel without lifting the Dutch Oven.

Another object of the invention is to provide a sturdy environmentally safe cooking platform and support for Dutch Ovens and for similar cooking apparatus. The invention not only holds the cooking fuel (typically charcoal brickets) but also the Dutch oven while the oven is being manipulated and used to cook food.

An important feature of the invention is it can be easily broken down without the use of tools into a small "one-piece" form for transportation via a backpack or other similar means.

An advantage of the invention is to provide a device for the "Expected Purposes" which does not require special tools, procedures, mechanical skills, aptitudes or abilities to apply and practice.

BRIEF DESCRIPTION OF THE DRAWINGS

Further objects, features and advantages of the present invention will become apparent as the following DESCRIPTION OF CERTAIN EMBODIMENTS proceeds taken in conjunction with reference to the accompanying drawings in which:

FIG. 5 is an elevated plan view of an alternative embodiment of the invention.

Similar reference characters and numerals refer to similar parts throughout the several views of the drawings.

DRAWING REFERENCE NUMERALS

100—Stand
105—Base of stand 100
110—Four side walls of stand 100
120—Legs
122—First section of leg 120
124—Rivet for hingeably attaching legs 120 to walls 110
126—Second section of leg 120
200—Dutch Oven
201—Lid of Dutch Oven 200
210—Charcoal cooking fuel on top surface of Dutch Oven 200
220—Charcoal cooking fuel resting in base 105 of stand 100
310—Side to side leveling mechanism
312—Housing for all bearing 314 in leveling mechanism 310
314—Ball bearing in leveling mechanism 310
316—Channel for ball bearing 314 in leveling mechanism 310
320—front-to-back leveling mechanism
322—Housing for ball bearing 324 in leveling mechanism 320
324—Ball bearing in leveling mechanism 320
326—Channel for ball bearing 324 in leveling mechanism 320
400—Rotatable platform assembly
402—Support plate of rotatable platform assembly 400
404—Base of Support plate 402
406—Rivet attaching base 404 to Support plate 402

DESCRIPTION OF CERTAIN EMBODIMENTS

Certain embodiments of the present invention will now be described with reference to the aforementioned figures.

Figure 1:
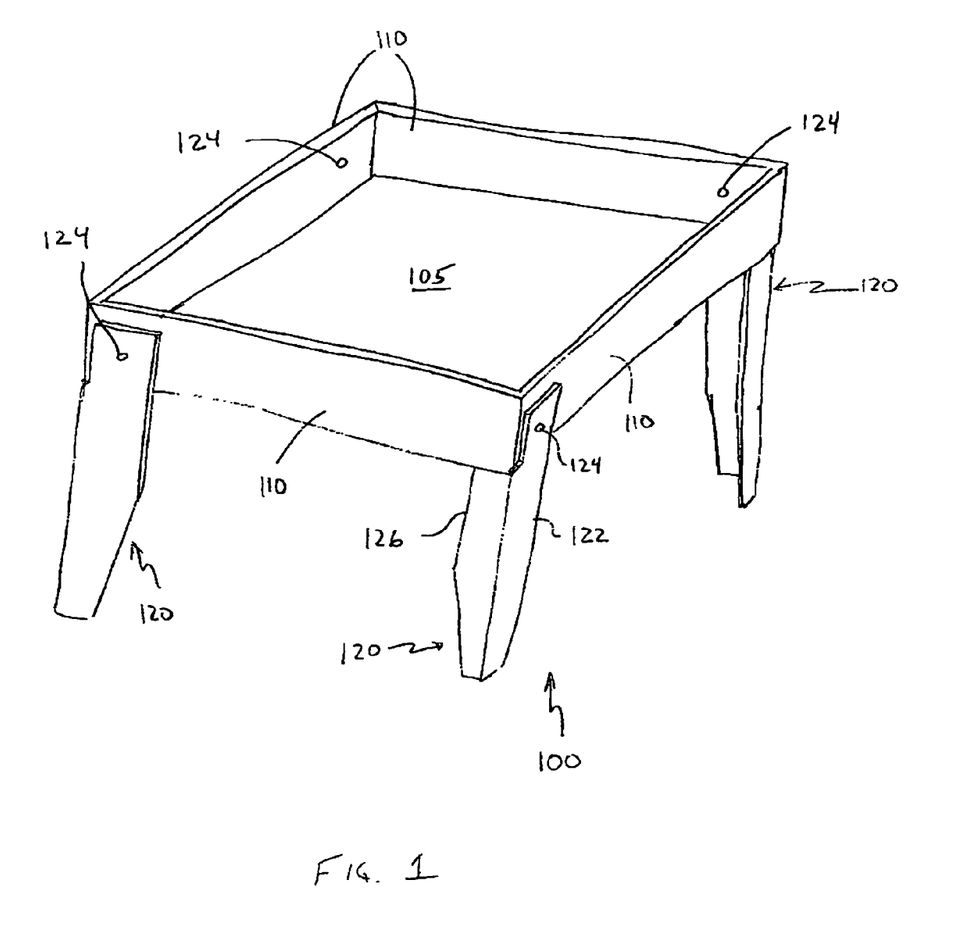
FIG. 1 is an elevated plan view of a Dutch oven stand according to one embodiment of the present invention.

As illustrated in FIG. 1, a stand 100 according to one embodiment of the present embodiment, generally includes a base 105 having four side walls 110 connected thereto, thereby forming a tray-like structure. The base 105 and sides 110 are supported by four legs 120. Each leg 120 includes a first section 122 and a second section 126 connected to each other at right angle, along the length of the leg 120, thereby providing substantially greater strength than a single rod shaped support leg, while also allowing legs 120 to be folded into a substantially flush position with sides 110 during storage and transport.

Each leg 120 is hingeably attached to a separate wall 110 by means of a rivet 124, although other attachment means, such as a screw, may be used. Because the legs 120 are hingeably attached, they can be positioned in either an opened (FIG. 1) or closed (FIG. 2) position. As illustrated, in FIG. 1 the position of the leg 120 and rivet 124 is such that the top surface (not shown) of the second leg section 126 contacts the bottom surface of the base 105 when the leg is in an opened position, namely just past vertical. As such, when the leg 120 is in an opened position, the contact between the upper edge of the second section 126 and the bottom of the base 105 prevents the leg 120 from opening further. While the top edge of the second section 126 and the base 105 serves as the stopping means in the present embodiment other means may be used, such as a pin or lip extending from the base and the like.

Figure 4:
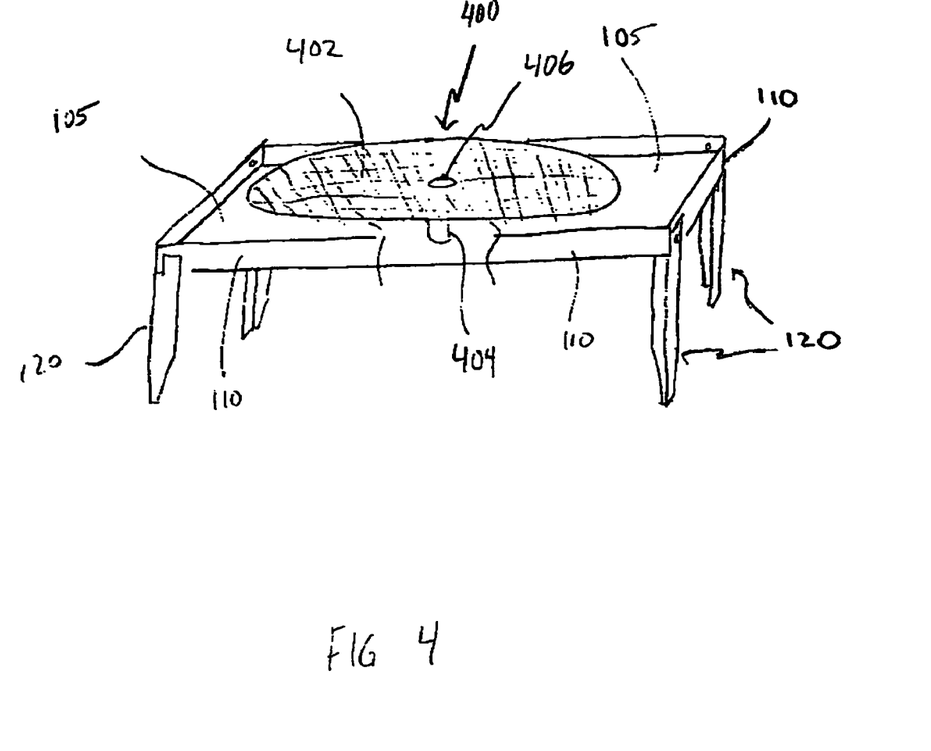
FIG. 4 is an elevated plan view of a stand including a rotatable platform according to one embodiment of the present invention.
Figure 5:
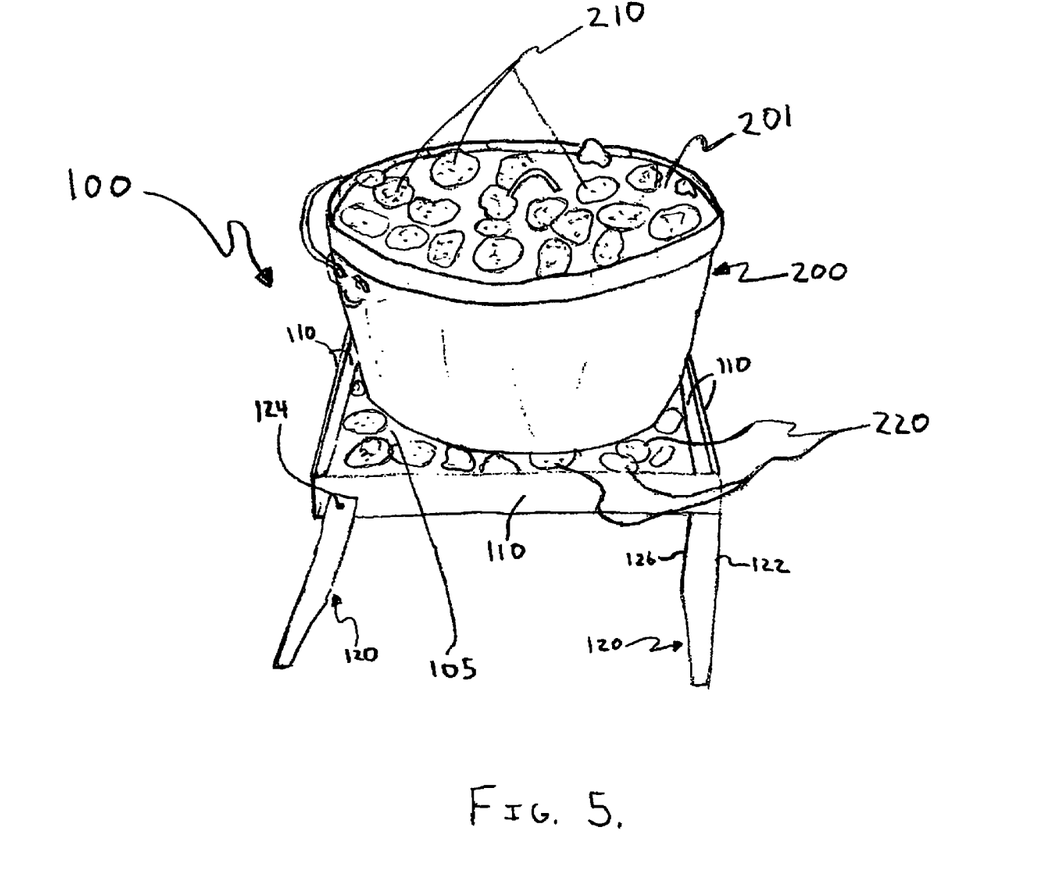
FIG. 5 is a perspective view of a preferred embodiment of the present invention depicted in use with a Dutch Oven.

FIG. 5 illustrates an embodiment of the invention with the legs 120 in an open position with the Stand 100 supporting a Dutch Oven 200 being used during cooking. As can been further seen in FIG. 5, charcoal cooking fuel 210 is typically placed on the lid 201 of the Dutch oven 200 and charcoal cooking fuel 220 is also placed on to the base 105 of the stand 100. Sides 110 act to keep the cooking fuel 220 from falling to the ground or from being blown by heavy winds out of position onto the ground. IN the embodiment of the invention illustrated in FIG. 5, the Dutch Oven 200 rests above the cooking fuel on legs not shown which form a part of the Dutch Oven 200 itself. In other embodiments of the invention described and depicted herein, a Dutch Oven can also be placed on top of a rotatable platform assembly 400 as illustrated in FIG. 4.

As will be appreciated by those skilled in the art, the stand 100 may be made of any suitable materials, including steel, aluminum and the like. Although the base 105 is illustrated as being generally square in shape, it is to be understood that its geometry may take any form suitable for holding the requisite number of charcoals and to accommodate the Dutch Oven. Accordingly, in alternate embodiments, the base is rectangular in shape having dimensions suitable for accommodating two Dutch Ovens, side-by-side. Furthermore, the dimensions of the stand may be changed as a matter of design choice to accommodate the particular Dutch oven being used.

In the present embodiment, which may be used with Dutch Ovens having diameters of 12 inches, the base 105 is 12 inches square, the walls 110 are one inch high and the legs are ten inches long. Although other dimensions may be used, those knowledgeable about Dutch Ovens will appreciate that the wall 110 are preferably of limited height to allow sufficient air circulation around the oven while also keeping the fuel contained in the base 105; walls higher than one inch tend to concentrate heat around the bottom of the oven and lead to uneven cooking. Also, the legs should be of sufficient length to protect the surface on which the stand sits from excessive heat, approximately 9–10 inches.

Figure 2:
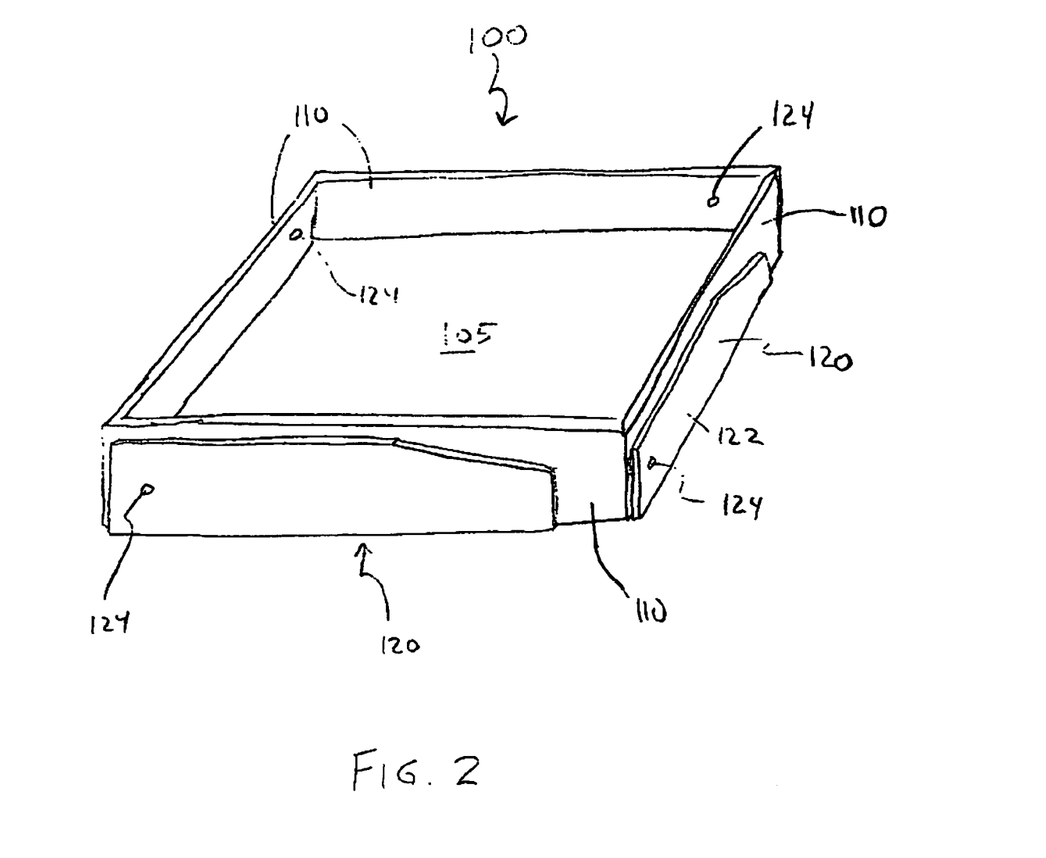
FIG. 2 is a second view of the stand of FIG. 1, illustrated in a folded position ready for transport.

Referring to FIG. 2, the stand 100 is illustrated with legs 120 in a closed position. More specifically, each leg 120 is hingeably moved towards the base 105 and wall 110 to which it is attached. Further the length of the legs 120 is such that they will not protrude over the top of the walls 110 or beyond them in any direction when folded, thereby maintaining the low aspect ratio of the Stand 100.

As will be appreciated by those skilled in the art, the stand 100 is thus made compact and has a low aspect ratio, thereby allowing for easy transport in a backpack or otherwise. Furthermore, because of the legs 120 are permanently attached to the stand 100, there is no risk of losing a leg 120. Similarly in other embodiments of the invention, the leveling mechanisms and rotatable platform are permanently attached to the stand 100.

Figure 3:
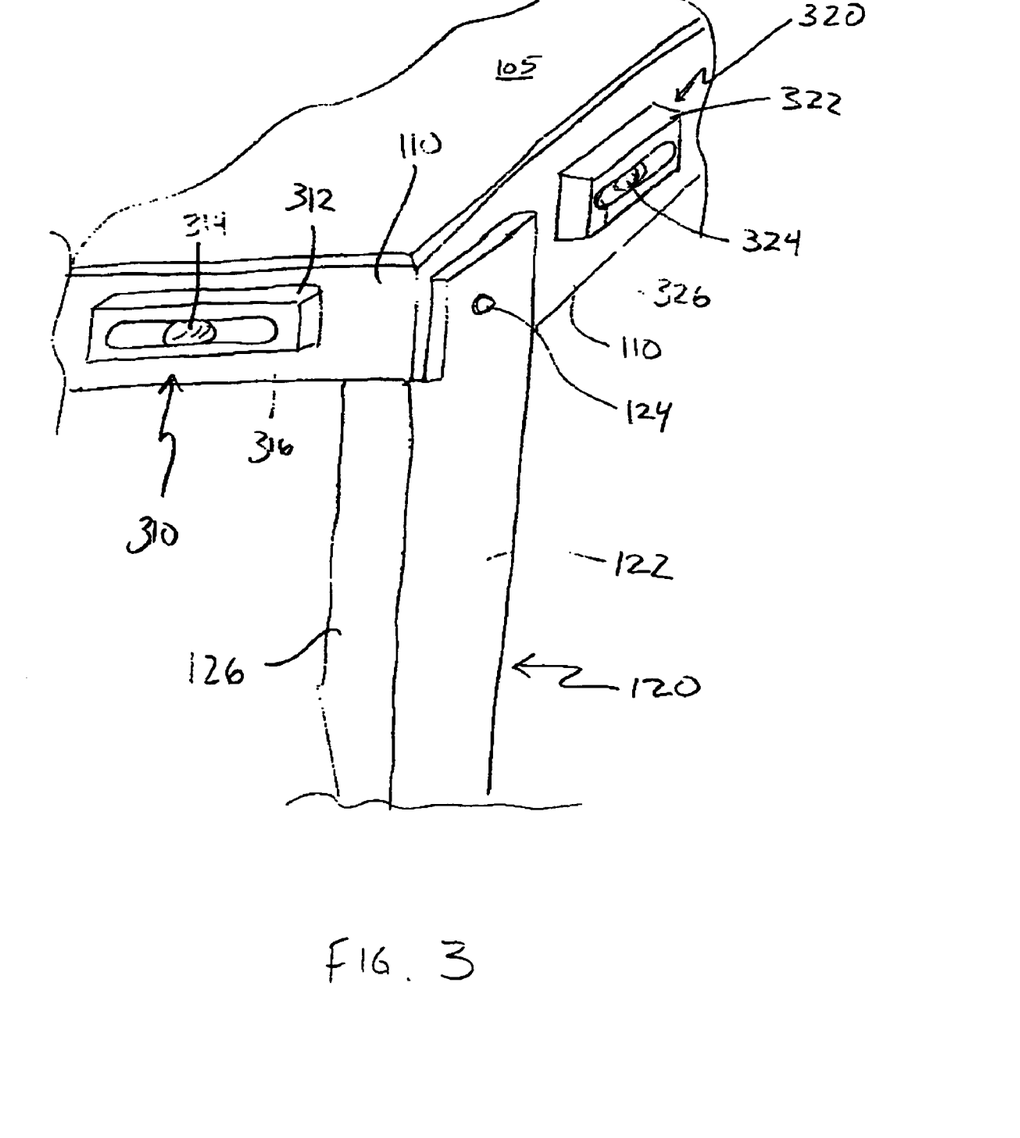
FIG. 3 is an enlarged sectional plan view illustrating leveling devices according to one embodiment of the present invention.

For example, as shown in FIG. 3, leveling devices maybe affixed to the stand 100. Such leveling devices are useful for insuring the food cooked in the Dutch oven, such as cakes and pies, cook evenly and are not, for example, on a slant. Thus, as shown in FIG. 3, the stand 100 includes two leveling mechanisms, a first 310 for ensuring the base 105 is level side-to-side, and a second 320 for ensuring that the base 105 is level front-to-back. The leveling mechanisms 310, 320 are preferably made of the same material as the walls 110, such as steel, and therefore are heat resistant. More specifically, each leveling mechanism, 310, 320 includes a housing 312, 322 for housing a ball bearing 314, 324. Notably, the size of the housing 312, 322 is larger than the diameter of the ball bearing 314, 324 such that when the ball bearing 314 is heated, and thus expands, the ball bearing 314, 324 is free to roll within the housing 312, 322. The housing 312, 322 further includes a channel 316, 326 along the length of the housing 312, 322. The channel 316, 326 is narrower then the diameter of the ball bearing 314, 324 such that, while the position of the ball bearing 314, 314 within the housing 312, 312 can be seen, the ball bearing 314, 324 cannot pass through the channel 316, 326. Although shown in the side of the housing 312, 322, the channel 316, 326 may be in the top of the housing 312, 322. In certain embodiments, the leveling mechanisms 310, 320 have visual indicator (e.g., a line) marking the center of the channel to identify level.

In operation, when setting up the stand 100, if the stand 100 is not level along one of its sides, then the leveling mechanism 310, 320 along that side will indicate as such by the ball bearing 314, 324 rolling to one end of the housing 312, 322. However, if the base 105 is substantially level along one side, then the leveling mechanism 310, 320 along that side 110 will indicate as such, with the ball bearing 314, 324 not rolling to one end of the housing 312, 322.

Another improvement to the stand 100 illustrated in FIGS. 1 and 2, is the addition of a rotatable platform. As shown in FIG. 4 (in which a portion of the front is not shown to better illustrate the features of the embodiment), a rotatable platform assembly 400 is rotatably attached to the base 105 of the stand 100. More specifically, the rotatable platform assembly 400 includes a rotatable support plate 402 which preferably is a sturdy screen mesh made out of the same material as the walls 110, supported on a base 404, which is affixed to the base 105. In general, the circular support plate 402 is positioned high enough over the base 105 such that charcoals may be place directly beneath the support plate 402 confined within the base 105. Platform 402 is positioned just above the charcoals, thereby allowing efficient transfer of heat from charcoals, through the circular support plate 402 to the Dutch oven, which sits atop the circular support plate 402. While the preferred support plate 402 is as set out herein is formed of a metal screen mesh, for purposes of the most effective heat transfer, it need not be and alliteratively a solid metal support plate 402 may be used.

In the present embodiment, the support plate 402 is rotatably mounted to the base 404 by means of a rivet 406, although other mechanisms, such as a screw could be used. The base 404, in turn, is fixably mounted to the stand base 105 by means of a screw passing through the base 105 into the base 404. Although not shown, the base 404 includes an internal threaded section for receiving the screw passing through the stand base 105.

It is to be understood that the rotatable platform assembly 400 may be attached to the stand 100 in any of a number of different ways. For example, in an alternate embodiment, the rotatable platform is fixably mounted to the base 404, which, in turn, is rotatably mounted to the stand base 105. In another embodiment, the base 404 includes a hollow center such that it can be placed on and receive a protrusion extending from the stand base 105. The protrusion would both support the rotatable platform assembly 400 and allow it to turn. In certain embodiments, the rotatable platform assembly 400 is fixably mounted to the stand 105 and the Dutch oven is simply rotated atop the rotatable platform.

In yet another alternate embodiment, the rotatable platform assembly 400 uses ball bearings to allow for its rotation. In still another embodiment, the platform includes a lip around its perimeter to help prevent the Dutch oven from falling off the platform.

Those skilled in the art will recognize that the stand of the present invention may be implemented in many ways, and such, is not to be limited by the foregoing illustrative embodiments and examples. In this regard, any number of the features of the different embodiments described herein may be combined into one single embodiment, and features of any given embodiment should be deemed to be optional, unless required by the claims annexed hereto. Moreover, the scope of the present invention covers conventionally known and future developed variations and modifications to the components described herein, as would be understood by those skilled in the art.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and combination and arrangement of parts, in addition to numerous changes in the methods and use thereof, may be resorted to with out departing from the spirit and scope of the invention.

What is claimed is:

1. A Dutch Oven stand, comprising:
   a base assembly having non-perforated sides and a non-perforated bottom surface defining an upwardly open, uncovered and unobstructed receptacle supporting a Dutch Oven directly on said bottom surface and containing solid cooking fuel on said bottom surface, in order to reduce the chance of unwanted fire while cooking in a Dutch Oven; and
   a plurality of non adjustable legs of predetermined fixed length rotatably coupled to said base assembly wherein said legs can be folded out to support said base assembly, or such legs can be folded into a substantially compact configuration with said base assembly to facilitate transportation of said base assembly.

2. The Dutch Oven Stand according to claim 1, wherein said foldable legs are not longer in any dimension than the longest dimension of said base assembly, in order to facilitate the folding of such legs into a flush configuration with said base assembly, and wherein such legs when in a folded position do not protrude in any direction which materially increases the overall dimensions of said base assembly.

3. A Dutch Oven stand according to claim 1 further including a heat resistant leveling means for leveling said base assembly at high temperatures, wherein said leveling means comprises a longitudinal and a lateral channel formed from the same material as said base assembly and each of which is affixed to said sides of said base assembly; and said channels each respectively have a heat resistant ball bearing of a smaller dimension than said channels, said bearings loosely disposed within each of said longitudinal and lateral channels; and wherein said bearings are visible within the channels.

4. An apparatus, comprising:

a base assembly having non-perforated sides and a non-perforated bottom surface defining an upwardly open, uncovered and unobstructed receptacle for supporting a Dutch Oven directly on said bottom surface and for holding and for containing solid cooking fuel on said bottom surface in order to reduce the chance of unwanted fire while cooking in a Dutch Oven; and a plurality of non adjustable legs of predetermined fixed length rotatably coupled to said base assembly wherein said legs can be folded out to support said base assembly, or such legs can be folded into a substantially compact configuration with said base assembly to facilitate transportation of said base assembly; and a heat resistant leveling means for leveling said base assembly, wherein said leveling means comprises a longitudinal and a lateral channel formed from the same material as said base assembly and each of which is affixed to said sides of said base assembly; and said channels each respectively have a heat resistant ball bearing of a smaller dimension than said channels, said bearings loosely disposed within each of said longitudinal and lateral channels; and wherein said bearings are visible within the channels.

\* \* \* \* \*